MOTION CONVERTING MEANS FOR REPRESENTING TIME DURATION IN TERMS OF A POSITION OF A MOVABLE MEMBER

Filed Feb. 26, 1964

PHILIP MADSEN
INVENTOR.

BY Lyon & Lyon
ATTORNEYS

United States Patent Office 3,250,139
Patented May 10, 1966

3,250,139
MOTION CONVERTING MEANS FOR REPRESENTING TIME DURATION IN TERMS OF A POSITION OF A MOVABLE MEMBER

Philip Madsen, 5137 W. Jefferson Blvd., Los Angeles, Calif.

Filed Feb. 26, 1964, Ser. No. 347,543
5 Claims. (Cl. 74—25)

Figures 1, 2, 3, 4, 5:
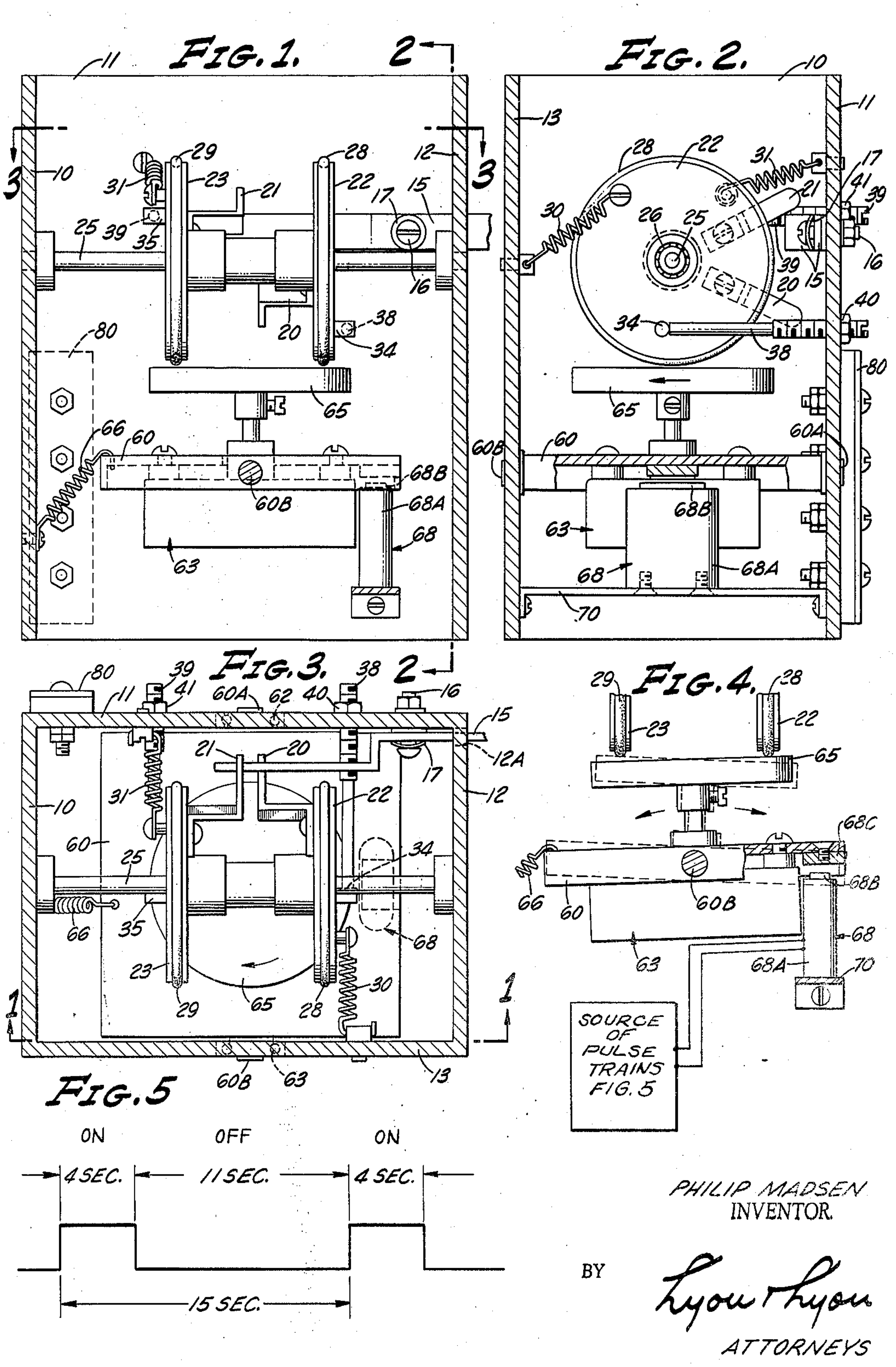

The present invention relates to means and techniques useful in producing an indication, measurement or control operation in accordance with the duration of a pulse which may be recurrent or otherwise.

Briefly, the apparatus described herein involves a lever or pointer which is positioned in accordance with the duration of a pulse having, for example, a periodicity of fifteen seconds. A synchronous motor is mounted on a pivoted plate and constantly drives a disc. This constantly rotating disc is selectively engageable with either one of two rim drivable wheels, a spring being effective during the "OFF" time of the pulse to pivot such plate in one direction and cause such disc to drive one of said wheels; and during the "ON" time of the pulse an electromagnet is energized to overcome the force of such spring and cause the plate to pivot in a direction opposite to such one direction and to cause the disc to drive the other wheel. Each of these wheels when not driven by the disc are returned by a spring common to each to a preset position from where rotation as aforesaid by the disc commences; and also, each of these wheels have an arm engageable with an intermediate portion of a frictionally maintained lever such that these arms, when motor driven, rotate in opposite directions to position such lever, the position of the lever thus being an indication of the "ON" time of the pulse.

It is therefore a general object of the present invention to provide an arrangement which is essentially a transducer for converting pulse duration to linear movement.

Another general object of the present invention is to provide an arrangement of the character indicated above.

Another object of the present invention is to provide an arrangement of this character which is simple, rugged and relatively inexpensive considering the accurate results achieved thereby.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates apparatus embodying features of the present invention, the view thereof being taken substantially as indicated by lines 1—1 in FIG. 3.

FIGS. 2 and 3 are views taken substantially as indicated by lines 2—2 and 3—3 in FIG. 1.

FIG. 4 illustrates two positions of operation of the apparatus, it being noted that the foregoing figures show the driving disc in an intermediate transient position engaging none of the two drivable wheels.

FIG. 5 illustrates a typical pulse trains which is applied to the apparatus from a source as indicated in FIGURE 4 and whose characteristics are indicated by the apparatus. As illustrated, the pulse train characteristics are the four second ON time of a pulse and that eleven second OFF time which follows the pulse and during which eleven second interval the pulse is absent, i.e., OFF. The term "pulse train" as used herein thus has reference to recurrent pulses and the time interval during which a pulse is present and the succeeding time interval during which such pulse is absent.

Essentially all of the apparatus, as illustrated, is mounted within a box type frame having the four walls 10, 11, 12 and 13 suitably secured together with the positionable indicating lever or actuator 15 extending through a slotted portion 12A of wall 12, the lever 15 being pivotally mounted by a bolt 16 passing through wall 11 and compressing a spring 17 to frictionally maintain such lever 15 in any one of its positions to which it may be actuated by either one of the two arms 20, 21 mounted respectively on drivable wheels 22, 23, these wheels 22 and 23 being selectively driven, as described later, in opposite directions to correspondingly be effective to pivot lever 15 in opposite directions.

Each wheel 22, 23 is free to rotate independently about a common axis defined by an axle 25 extending between plates 10 and 12, and these wheels for this purpose may be mounted on such axle using antifriction ball bearing means, as exemplified at 26 in FIG. 2.

Each wheel 22, 23 includes a peripherally mounted O ring 28, 29 and each has an associated coil tension return spring 30, 31 effective to correspondingly return a projection 34, 35 on wheels 22, 23, respectively, against a corresponding adjustable stationary stop member 38, 39.

These stop members 38, 39 are each threaded in wall 11 and once adjusted, the adjustment is secured by corresponding lock nuts 40, 41.

It is noted that spring 30 has one of its ends attached in FIG. 2 to a bracket on wall 13 and the other one of its ends attached to a pin on wheel 22; and similarly, spring 31 has one of its ends attached to a bracket in FIG. 2 on wall 11 and the other one of its ends attached to a pin on wheel 23 so that, as seen in FIG. 2, spring 30 tends to rotate wheel 22 in the counterclockwise direction, and spring 31 tends to rotate wheel 23 in the opposite or clockwise direction.

These wheels 22 and 23 are alternatively motor driven against the force of their corresponding springs 30, 31 using the means now described specifically.

A rockable plate 60 is formed with shaft portions 60A, 60B and is gimbaled in the stationary plates 11 and 13 using bearings 62, 63, as illustrated in FIG. 3. Mounted on plate 60 is a synchronous motor construction 63 which constantly rotates a drive disc 65 through a suitable self-contained gear reduction unit which is part of the motor construction 63. The motor 63 is energized through flexible leads (not shown).

Attached to rockable plate 60 is one end of a coil tension spring 66 having its other end secured to stationary plate 10 so that normally (during the "OFF" time of a pulse described later), as illustrated in full lines in FIG. 4, the drive disc 65 drives the wheel 22 in a clockwise direction, as viewed in FIG. 2. To disestablish the normal driving connection between disc 65 and wheel 22 and to establish a drive connection between disc 65 and wheel 23, the force of the biasing spring 66 is overcome and the plate 60 rocked in bearings 62, 63 using an electromagnet structure 68 to which the pulse in question is applied as indicated in FIGURE 4.

This structure 68 includes a coil 68A with a pole piece 68B for magnetically attracting an armature member 68C on plate 60, the coil 68A and its pole piece 68B being secured on a cross member 70 having its opposite ends secured on stationary walls 11 and 13.

A typical pulse applied to coil 68B for rocking plate 60 and establishing a drive connection between disc 65 and wheel 23 is illustrated in FIG. 5 wherein the periodicity is 15 seconds with an ON time of 4 seconds and an OFF time of 11 seconds.

In typical operation of the particular system, the disc 65 rotates at a constant speed of one revolution per minute in which case a ninety degree rotation of disc 65 corresponds to an elapsed time of 15 seconds. The planes of wheels 22 and 23 are parallel and equidistant from a projection of the axis of rotation of disc 65 (in its intermediate or transitory position shown in FIG. 1), the planes of wheels 22 and 23 being spaced, for example, a distance of one and one-half (1½) inches. The diameters of wheels 22 and 23 are equal which may have a diameter such that, for example, the same is driven through an arc of 60 degrees in 15 seconds.

During the OFF time of the pulse, the wheel 22 is driven in the clockwise direction in FIG. 2 against the action of spring 30 and its arm 20 moves to engage and move the lever 15 against the frictional forces developed thereon by spring 17 (FIG. 3). This movement of lever 15 continues until the leading edge of the pulse appears at which time the electromagnet 68 is energized to disestablish the connection between disc 65 and wheel 22 and to establish a driving connection between disc 65 and wheel 23; also, at this particular instant, the spring 30 causes the wheel 22 to rotate in the counterclockwise direction in FIG. 2 with such return movement being limited by adjustable stop 38; but the lever 15 is maintained by the frictional forces acting thereon at its point of advancement.

When the wheel 23 is thus driven, it is driven in the opposite direction against the action of its spring 61.

The system is capable of different adjustments for achieving different indications or response of lever 15 by adjustment of the stop elements 38, 39. Thus, for example, the stops may be adjusted to produce the following results. For a 15 second period pulse, as illustrated, and assuming an 11 second OFF time and a 4 second ON time, during the OFF time the lever 15 is advanced $^{11}/_{15}$ of 60 degrees, and during the succeeding ON time pulse the arm 21 is rotated $^{4}/_{15}$ of 60 degrees to a point where it just touches the lever 15 without displacing the same from the position to which it had been moved during OFF time. The lever then will remain in such position during succeeding trains of pulses of the same character as illustrated in FIG. 5. Assuming, for example, however, that the pulse is altered to have an ON time of 5 seconds and an OFF time of 10 seconds, then during rotation of arm 21 during the ON time of 5 seconds the lever position is altered by $^{1}/_{15}$ of 60 degrees or 4 degrees, and such lever remains in the position until the ON and OFF times are changed. The stops 38, 39 may be adjusted differently so that during the assumed pulse of FIG. 5, the lever 15 is moved to a maximum position during the 11 second interval and is moved in an opposite direction to a minimum position during the 4 second interval.

It will be apparent to those skilled in the art that the lever 15 may be incorporated in different systems such as, for example, the lever 15 may comprise a pointer of a pointer dial system with the dial having indicia calibrated in terms of ON time or OFF time or both; the lever 15 may be connected to an electrical sender or transducer such as, for example, the movable arm of a linear resistance potentiometer for developing an electrical output responsive to lever position, and such electrical output may be used for a variety of purposes either for local or remote control or indication; or the lever 15 may have attached thereto a stylus cooperating with a recording tape also driven by a synchronous motor supplied with power from the same power source used to energize motor 63 for synchronization purposes.

For these purposes, the apparatus may include a terminal strip 80 (FIG. 2) having four terminals, two of which are connected to the motor 63 through flexible leads and the other two of which are connected to the electromagnet coil 68A for application of the pulse train thereto.

It will also be apparent that the apparatus is effective for the measurement or indication of pulse periodicity and may be modified to be operative with pulses of different nominal periodicity by, for example, changing the effective diameter or the speed of the drive disc 65.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Converting means of the character described, including a constant rotating element, a pair of rotatable elements, means selectively coupling said rotating element to either of said rotatable elements to drive the same alternately in opposite directions, and a movable member in the path of movement of said rotatable elements and positioned by said rotatable elements, said coupling means including a pivoted structure mounting a drive motor, resilient means urging said pivoted structure to cause said rotating element to move into driving engagement with one of said rotatable elements, and an electromagnet structure having a movable part thereof connected to said pivoted structure for pivoting said pivoted structure against the force of said resilient means to cause said rotating element to drive the other of said rotatable elements.

2. Converting means as set forth in claim 1, including resilient means independently acting on each of said rotatable elements to restore said rotatable elements to an initial position when said rotating element is disengaged therefrom.

3. Converting means as set forth in claim 2, including adjustable stop means engageable with a portion of said rotatable means to establish said initial position.

4. Converting apparatus of the character described, including a stationary supporting structure, a pair of spaced drivable wheels each of substantially the same diameter and each being mounted for independent rotation about a common axis on said structure, a motor support, means pivotally mounting said motor support on said structure for pivotal movement about a pivot axis spaced from and substantially perpendicular to said common axis, a motor on said support, a disc coupled to the output shaft of said motor and driven thereby, said shaft having its axis extending substantially midway between the planes of said drivable wheels and intersecting said pivot axis of said motor support, resilient means acting between said structure and said motor support and urging said disc into driving engagement with the periphery of one of said wheels, an electromagnet structure receptive to a pulse train having an OFF time and an ON time and effective during such ON time to pivot said motor support against the action of said resilient means to disestablish said driving engagement and to establish a driving engagement between said disc and the periphery of the other of said wheels to drive the same in a direction opposite to the direction in which said one wheel is driven, resilient means acting between said supporting structure and said one wheel for returning the same to an initial position, resilient means acting between said supporting structure and said other wheel for returning the same to an initial position, a pair of arms each mounted on a corresponding one of said wheels, a lever, means pivoting said lever on said supporting structure including means frictionally maintaining the same in different ones of its pivoted positions, said lever extending between said arms for engagement and movement by the same when said wheels are driven by said disc.

5. Converting apparatus as set forth in claim 4, including adjustable means for establishing each of said initial positions.

(References on following page)

References Cited by the Examiner

UNITED STATES PATENTS

| | | | |
|---|---|---|---|
| 670,535 | 3/1901 | Carson | 74—202 |
| 1,424,027 | 7/1922 | Murphy | 74—202 |
| 1,459,946 | 6/1923 | Camorata et al. | |
| 1,486,923 | 3/1924 | Ross. | |
| 1,672,241 | 6/1928 | Amonsen | 74—324 |
| 2,125,769 | 8/1938 | Crocker | 74—324 X |
| 2,468,453 | 4/1949 | Mallentjer | 74—202 X |
| 2,525,443 | 10/1950 | Bischoff | 74—202 |
| 2,809,613 | 10/1957 | Westbrook | 74—323 X |
| 2,946,418 | 7/1960 | Leeson | 192—18 X |
| 2,972,900 | 2/1961 | Bailey et al. | 74—354 |
| 3,046,799 | 7/1962 | Ash et al. | 74—96 X |
| 3,065,645 | 11/1962 | Musser | 74—89 X |

FOREIGN PATENTS

| | | |
|---|---|---|
| 704,081 | 2/1954 | Great Britain. |
| 923,268 | 4/1963 | Great Britain. |

BROUGHTON G. DURHAM, *Primary Examiner.*

D. H. THIEL, *Assistant Examiner.*